(12) United States Patent
Honkanen (10) Patent No.: US 11,747,476 B2
(45) Date of Patent: Sep. 5, 2023

(54) DYNAMICALLY INTERLACED LASER BEAM SCANNING 3D DEPTH SENSING SYSTEM AND METHOD

(71) Applicant: Microvision, Inc., Redmond, WA (US)

(72) Inventor: Jari Honkanen, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 1177 days.

(21) Appl. No.: 16/385,931

(22) Filed: Apr. 16, 2019

(65) Prior Publication Data

US 2020/0333465 A1 Oct. 22, 2020

(51) Int. Cl.
| | | |
|---|---|---|
| *G01C 3/08* | (2006.01) | |
| *G01S 17/89* | (2020.01) | |
| *G01S 7/484* | (2006.01) | |
| *G01S 7/4861* | (2020.01) | |
| *G01S 7/481* | (2006.01) | |

(52) U.S. Cl.
CPC ............ *G01S 17/89* (2013.01); *G01S 7/484* (2013.01); *G01S 7/4817* (2013.01); *G01S 7/4861* (2013.01)

(58) Field of Classification Search
CPC ........ G01S 17/89; G01S 7/4817; G01S 7/484; G01S 7/4861
See application file for complete search history.

(56) References Cited

U.S. PATENT DOCUMENTS

2017/0068319 A1* 3/2017 Viswanathan ......... H04N 23/56
2019/0105514 A1* 4/2019 Amstutz ................ A61B 34/20

OTHER PUBLICATIONS

Lanman, et al., "Build Your Own 3D Scanner: 3D Photography for Beginners", Siggraph 2009 Course Notes, Aug. 5, 2009, Aug. 5, 2009, 1-87.
Salvi, et al., "A State of the Art in Structured Light Patterns for Surface Profilometry", Pattern Recognition, vol. 43, Issue 8, Aug. 2010, Aug. 1, 2010, 1-15.
Salvi, et al., "Pattern Codification Strategies in Structured Light Systems", Pattern Recognition, vol. 37, Issue 4, Apr. 2004, Apr. 1, 2004, 1-26.

* cited by examiner

*Primary Examiner* — Samantha K Nickerson
(74) *Attorney, Agent, or Firm* — Kevin D. Wills (57) ABSTRACT

Laser light pulses are generated and scanned in a raster pattern in a field of view. The laser light pulses are generated at times that result in structured light patterns and non-structured light patterns. The structured light patterns and non-structured light patterns may be in common frames or different frames. Time-of-flight measurement is performed to produce a first 3D point cloud, and structured light processing is performed to produce a second 3D point cloud.

19 Claims, 9 Drawing Sheets

FRAME      N      N+1

DYNAMICALLY INTERLACED LASER BEAM SCANNING 3D DEPTH SENSING SYSTEM AND METHOD

FIELD

The present invention relates generally to distance measurement systems, and more specifically to laser based distance measurement systems.

BACKGROUND

Figure 1:
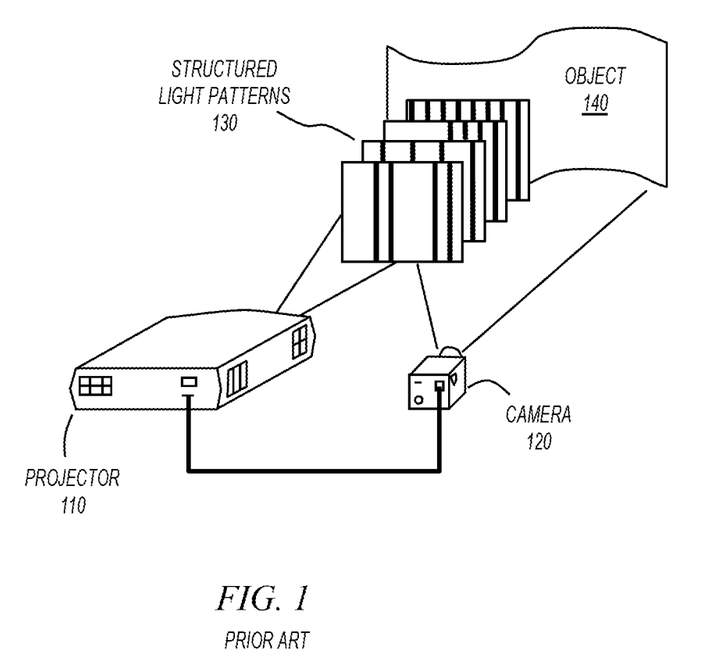
FIG. 1 shows a prior art structured light 3D depth sensing system.

Three dimensional (3D) depth sensing systems may be realized using different techniques. For example, FIG. 1 shows a prior art structured light 3D depth sending system. Projector 110 projects structured light patterns 130 on a 3D object 140, and camera 120 captures reflections of those structured light patterns. Deformations of the structured light patterns in the captured reflections are analyzed to calculate depth and surface information of object 140.

Structured light 3D sensing systems are generally well known. For example, J. Salvi et al. (2010) A state of the art in structured light patterns for surface profilometry *Pattern Recognition*, 43, 2666-2680 (hereinafter referred to as "Salvi") describes and classifies various structured light pattern techniques useful for generating 3D surface information of observed objects.

Structured light 3D depth sensing systems typically generate high accuracy 3D sensing information at the expense of time. For example, a typical structured light 3D sensing system may require many frames of captured light reflections to create a high accuracy 3D point cloud.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
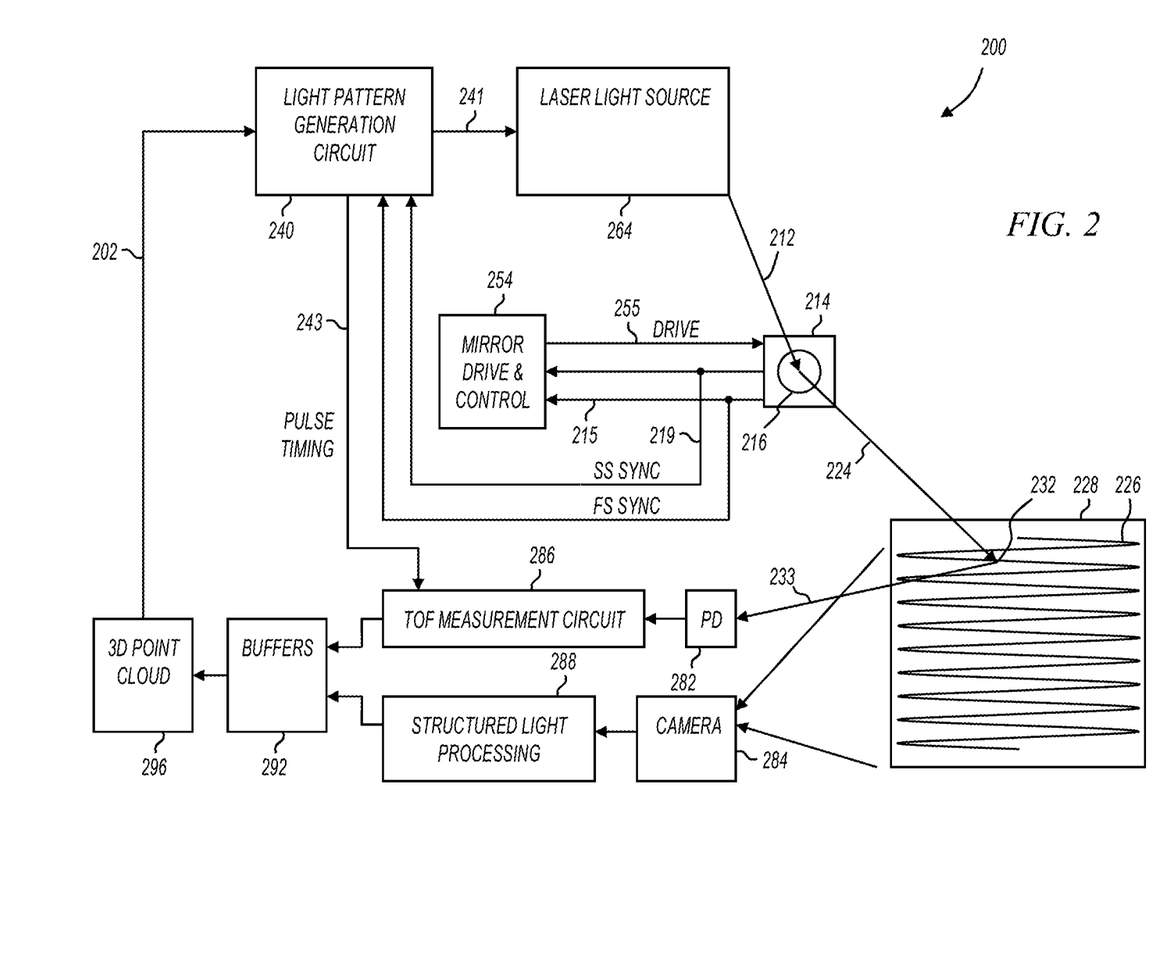
FIG. 2 shows a 3D depth sensing system in accordance with various embodiments of the present invention.

FIG. 2 shows a 3D depth sensing system in accordance with various embodiments of the present invention. System 200 includes light pattern generation circuit 240, laser light source 264, scanning platform 214 with scanning mirror 216, and mirror drive and control circuit 254. System 200 also includes photodetector (PD) 282, time-of-flight (TOF) measurement circuit 286, camera 284, structured light processing circuit 288, buffers 292, and 3D point cloud storage 296.

Light source 264 includes at least one light source capable of emitting pulses of laser light. Light source 264 may include one, two, or more light sources, and any number of light sources at different wavelengths may be included. For example, in some embodiments, a single laser light source that emits light in the infrared spectrum is included. Also for example, in some embodiments, a single laser light source that emits light in the visible spectrum is included. In still further embodiments, multiple laser light sources are included that emit light in any combination of visible and non-visible spectrum. Light source 264 also may include optics whose purpose is to focus and collimate light beam(s) from one or more light sources within light source 264 such that light emitted from light source 264 travels on a collimated path shown as modulated laser beam 212. The beam 212 impinges on a scanning platform 214 which is part of a microelectromechanical system (MEMS) based scanner or the like, and reflects off of scanning mirror 216 to generate a controlled output beam 224.

A scanning mirror drive and control circuit 254 provides one or more drive signal(s) 255 to control the angular motion of scanning mirror 216 to cause output beam 224 to generate a raster scan 226 in a field of view 228. In operation, light source 264 produces light pulses at different times and scanning mirror 216 reflects the light pulses as beam 224 traverses raster scan 226.

In some embodiments, raster scan 226 is formed by combining a sinusoidal component on the horizontal axis and a sawtooth component on the vertical axis. In these embodiments, controlled output beam 224 sweeps back and forth left-to-right in a sinusoidal pattern, and sweeps vertically (top-to-bottom) in a sawtooth pattern with the display blanked during flyback (bottom-to-top). FIG. 2 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern. The vertical axis is also referred to as the slow scan axis, and the horizontal axis is also referred to as the fast-scan axis. The labels "vertical" and "horizontal" are somewhat arbitrary, since a 90 degree rotation of the apparatus will switch the horizontal and vertical axes. Accordingly, the terms "vertical" and "horizontal" are not meant to be limiting. Each sweep of the raster pattern constitutes, and is referred to herein as, a "frame."

Although scanning mirror 216 is shown as a single mirror that scans in two dimensions, this is not a limitation of the present invention. For example, in some embodiments, mirror 216 is replaced by two mirrors, one scanning in one dimension, and a second scanning in a second dimension.

In operation, mirror drive and control circuit 254 provides drive signal(s) 255 to control the angular motion of scanning mirror 216. In some embodiments, scanning mirror 216 includes one or more sensors to detect the angular position or angular extents of the mirror deflection (in one or both dimensions). For example, in some embodiments, scanning platform 214 includes a piezoresistive sensor that delivers a voltage that is proportional to the deflection of the mirror on the fast-scan axis. Further, in some embodiments, scanning platform 214 includes an additional piezoresistive sensor that delivers a voltage that is proportional to the deflection of the mirror on the slow-scan axis. The mirror position information is provided back to mirror drive and control circuit 254 as the slow scan (SS) sync signal 219 and the fast scan (FS) sync signal 215. In these embodiments, mirror drive and control circuit 254 includes one or more feedback loops to modify the drive signals in response to the measured angular deflection of the mirror.

Mirror drive and control circuit 254 is implemented using functional circuits such as phase lock loops (PLLs), filters, adders, multipliers, registers, processors, memory, and the like. Accordingly, mirror drive and control circuit 254 may be implemented in hardware, software, or in any combination. For example, in some embodiments, control circuit 254 is implemented in an application specific integrated circuit (ASIC). Further, in some embodiments, some of the faster data path control is performed in an ASIC and overall control is software programmable.

PD 282 receives reflections of light pulses. Light pulses within controlled output beam 224 reflect off object(s) in the field of view 228 and those reflections 233 are detected by PD 282. PD 282 may include a filter that matches the wavelength of light emitted from laser light source 264. For example, in some embodiments, laser light source 264 emits infrared laser light pulses, and PD 282 detects infrared laser light pulses of the same wavelength. Also for example, in some embodiments, laser light source 264 may include two or more laser light sources that emit laser light pulses at multiple infrared wavelengths, and PD 282 may include multiple photodetectors that detect light at matching infrared wavelengths. In still further embodiments, laser light source 264 may emit laser light pulses in the visible spectrum and PD 282 may detect light at the same wavelength in the visible spectrum.

For example, in some embodiments, light source 264 may include a laser diode that produces infrared light with a wavelength of substantially 850 nanometers (nm), and PD 282 may detect light pulses with a wavelength of substantially 850 nm. Also for example, in some embodiments, light source 264 may include a laser diode that produces infrared light with a wavelength of substantially 900 nanometers (nm), and PD 282 may detect light pulses with a wavelength of substantially 900 nm. The wavelength of light is not a limitation of the present invention. Any wavelength, visible or non-visible, may be used without departing from the scope of the present invention.

Time-of-flight (TOF) measurement circuit 286 receives pulse timing information 243 from light pattern generation circuit 240 and compares it to the timing of pulse reflections detected by PD 282 to measure round trip times-of-flight of laser light pulses, thereby measuring the distance (Z) to the point 232 in the field of view 228 from which the laser light pulse was reflected. The distance information is used to create a 3D point cloud that describes the 3D contour detected in the field of view.

In some embodiments, TOF measurement circuit 286 includes multiple measurement circuits capable of measuring times-of-flight of light pulses of different wavelengths. For example, in some embodiments, laser light source 264 emits laser light pulses of different wavelengths, PD 282 includes multiple photodetectors to detect light at the different wavelengths, and TOF measurement circuit 286 includes one TOF measurement circuit for each wavelength. TOF measurement circuits may be implemented with any suitable circuit elements. For example, in some embodiments, TOF measurement circuit 286 includes digital and/or analog timers, integrators, correlators, comparators, registers, adders, or the like to compare the timing of the reflected laser light pulses with the pulse timing information received from light pattern generation circuit 240.

The rate at which pulses are created, reflected, and processed in the TOF measurement circuits may determine the horizontal spatial measurement resolution on raster pattern 226. For example, if pulses are created far apart in time, then measured points on raster pattern 226 may be further apart, and the horizontal spatial resolution will decrease. Also for example, if pulses are created closer in time, then the horizontal spatial resolution can increase. In some embodiments, spatial interleaving of pulses of different wavelengths allows for closer pulse spacing and higher resolution on the horizontal axis.

Camera 284 captures images projected in the field of view. In some embodiments, camera 284 is an infrared camera, and in other embodiments, camera 284 is a camera that captures light in the visible spectrum. For example, in some embodiments, laser light source 264 emits infrared light at a particular wavelength, and camera 284 captures light at that same wavelength. Also for example, in some embodiments, laser light source 264 emits light in the visible spectrum, and camera 284 captures light in the visible spectrum.

Structured light processing circuit 288 receives images captured by camera 284, and creates a 3D point cloud using structured light processing techniques. As used herein, the term "structured light processing" refers to any processing that analyzes deformation in an image to render 3D data. For example, structured light processing circuit 288 may include any of the structured light processing approaches described in Salvi.

Buffers 292 receive TOF measurement information from TOF measurement circuit 286 and also receive calculated depth information from structured light processing circuit 288. In some embodiments, buffers 292 include enough storage capacity to store multiple frames of depth information from both TOF measurement circuit 286 and structured light processing circuit 288. In some embodiments, buffers 292 stores first 3D point cloud data generated by TOF measurement circuit 286 as well as second 3D point cloud data generated by structured light processing circuit 288. The first and second 3D point cloud data may include depth information for common points within the field of view or may include depth information for mutually exclusive points within the field of view. This is described in more detail below.

3D point cloud storage 296 receives 3D point cloud information corresponding to distance (Z) information from buffers 292. In some embodiments, the distance information held in buffers 292 is inserted in 3D point cloud storage 296 in an array format such that the location within 3D point cloud storage indicates the location within the field of view from which the measurement was taken. In other embodiments, the TOF measurements held in buffers 292 include (X,Y) position information as well as TOF measurement information to yield (X,Y,Z) as a three dimensional (3D) data set that represents a 3D point cloud of the measured portion of the field of view 228. The 3D point cloud data may then be used for any suitable purpose. Examples include 3D depth sensing, gesture recognition, and the like.

3D point cloud storage 296 may be implemented using any suitable circuit structure. For example, in some embodiments, 3D point cloud storage 296 is implemented in a dual port memory device that can be written on one port and read on a second port. In other embodiments, 3D point cloud storage 296 is implemented as data structures in a general purpose memory device. In still further embodiments, 3D point cloud storage 296 is implemented in an application specific integrated circuit (ASIC).

Light pattern generation circuit 240 controls the generation of laser light pulses and causes them to be generated at times that spatially place the pulses in a desired pattern within the field of view. For example, light pattern generation circuit 240 may produce structured light patterns or non-structured light patterns. As used herein, the term "structured light patterns" refers to any pattern of light occupying a full frame or less than a full frame that is capable of supporting structured light processing. Example structured light patterns include binary patterns, De Bruijn patterns, and phase shifting patterns. As used herein, the term "non-structured light patterns" refers to any light pattern that is not a structured light pattern. One example of a non-structured light pattern is a dense array of pixels in an entire frame.

Light pattern generator 240 receives 3D point cloud information on node 202 and mirror position information (SS SYNC, FS SYNC) on nodes 215, 219, and provides pulses to laser light source 264 and pulse timing information on node 243. In some embodiments, light pattern generation circuit determines light patterns to generate based solely on mirror position, and in other embodiments, light pattern generation circuit 240 determines light patterns to generate based on a combination of mirror position and previously generated 3D point cloud data.

Light pattern generation circuit 240 may be implemented using any suitable circuit elements. For example, light pattern generation circuit 240 may be implemented using a processor and memory, a dedicated state machine, registers, adders, multipliers, and the like.

Various embodiments of the present invention combine TOF measurement and structured light processing to balance 3D point cloud accuracy and acquisition speed. Structured light processing can be quite accurate, but is relatively slow. TOF measurements are very fast, but tend to be less accurate. As used herein, the term "TOF 3D point cloud" refers to 3D point cloud data that is generated using TOF measurements, and the term "structured light 3D point cloud" refers to 3D point cloud data that is generated using structured light processing techniques.

In some embodiments, TOF measurements are made for every emitted light pulse regardless whether a structured light pattern or non-structured light pattern is displayed. In these embodiments, a TOF 3D point cloud may be generated very quickly, and can then be augmented with a structured light pattern 3D point cloud. In other embodiments, structured light patterns and non-structured light patterns are combined, mixed, or alternated in a manner that allows structured light processing to process the captured reflections of structured light patterns and allows TOF measurement to measure TOF in non-structured light patterns. For example, in some embodiments, structured light patterns and non-structured light pattern are alternated every frame or every nth frame. Also for example, in some embodiments, structured light patterns and non-structured light patterns are projected in the same frame. In all of these embodiments, the TOF measurements may be performed for both the structured and non-structured light patterns or may be limited to the non-structured light patterns.

In some embodiments, the amount and/or location of structured light patterns and non-structured light patterns may be modified in response to previously generated 3D point cloud content. For example, if a portion of the 3D point cloud content corresponding to a location within the field of view is dynamic from frame to frame, the projected content surrounding that location may be switched to, or maintained as, a non-structured light pattern to allow dense TOF measurements surrounding that location. As the dynamic 3D point cloud content moves through the field of view, the relative mix and location of structured light content vs. non-structured light content may be modified from frame to frame to track the movement in the field of view. These and other embodiments are described in more detail below.

Figure 3:
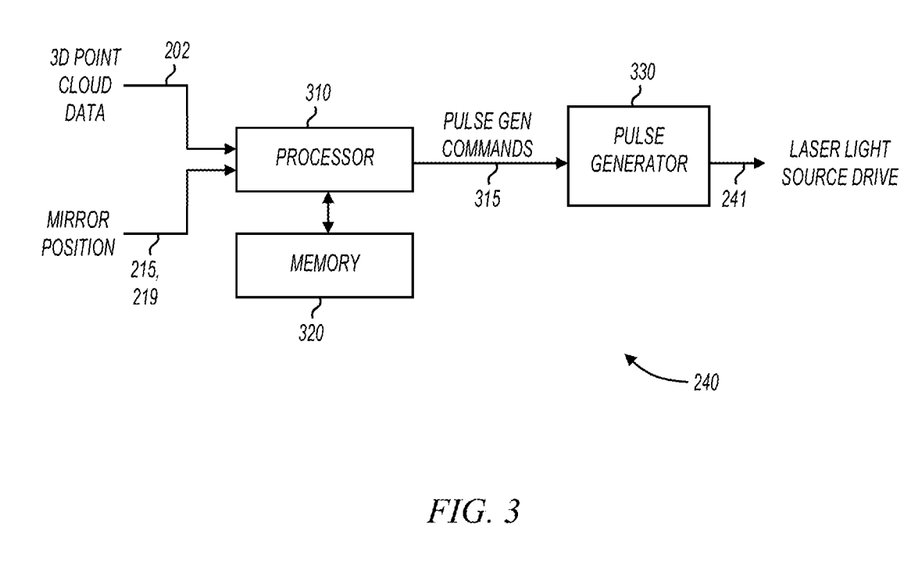
FIG. 3 shows a light pattern generation circuit in accordance with various embodiments of the present invention.

FIG. 3 shows a light pattern generation circuit in accordance with various embodiments of the present invention. Light pattern generation circuit 240 includes processor 310, memory 320, and pulse generator 330. Processor 310 may be any processing device capable of executing instructions to achieve a desired result. For example, processor 310 may be a microprocessor, a microcontroller, a digital signal processor, or the like. Memory 320 may be any nontransitory storage medium capable of storing instructions to be executed by processor 310. For example, memory 320 may be a static random access memory device, a read only memory device, or the like. In some embodiments, memory 320 stores instructions as well as data. For example, memory 320 may store instructions to be executed by processor 310 as well as data structures used to store intermediate or final results of the methods performed by processor 310 as it executes instructions stored in memory 320.

Pulse generator 330 receives pulse generation commands from processor 310 at 315. In response to the pulse generation commands, pulse generator 330 generates pulses at 241 suitable to drive a laser light source. For example, pulse generator 330 may control the power level, pulse shape, or any other characteristic of the pulses used to drive laser light source 264 (FIG. 2). Pulse generator 330 may be implemented with any suitable circuit elements. For example, in some embodiments, pulse generator 330 includes digital-to-analog converters, amplifiers, filters, and the like.

In operation, light pattern generation circuit 240 receives information describing the current mirror position at 215, 219, and determines the timing of pulses generated by the laser light source. For example, in some embodiments, light pattern generation circuit 240 generates pulses at times that correspond to a structured light pattern such as a binary pattern or a De Bruijn pattern. Also for example, in some embodiments, light pattern generation circuit 240 generates pulses at times that correspond to a non-structured light pattern such as a dense pixel array. In still further embodiments, light pattern generation circuit 240 generates pulses at times that correspond to a combination of structured and non structured light patterns. For example, structured light patterns and non-structured light patterns may be included in a single frame, or structured light patterns and non-structured light patterns may be in different frames.

In some embodiments, light pattern generation circuit is responsive to 3D point cloud data received at 202. For example, processor 310 may determine if the 3D point cloud data is static or dynamic and modify the generated light pattern in response. In some embodiments, if the 3D point cloud data is dynamic (changing from frame to frame), the generated light pattern may be modified from structured light to non-structured light in order to allow the TOF measurement circuits to quickly generate TOF point cloud data to track the movement in the field of view. Similarly, if the 3D point cloud is static, the generated light pattern may be modified from non-structured light to structured light to allow the structured light processing circuits to generate a more accurate 3D point cloud.

In still further embodiments, the generated light pattern may be modified such that a portion of a frame may include non-structured light patterns while the remaining portions of the same frame may include structured light patterns. The portion of the frame that includes non-structured light patterns may be modified from frame to frame to follow any dynamic portion of the field of view. This allows a dynamic portion of the 3D point cloud to be measured quickly while at the same time allowing a static portion of the 3D point cloud to be measured with higher accuracy.

Although light pattern generation circuit 240 is shown implemented with a processor and memory, this is not a limitation of the present invention. For example, in some embodiments, light pattern generation circuit 240 may be implemented with dedicated, nonprogrammable hardware circuits such as registers, adders, multipliers, comparators, and the like.

Figure 4:
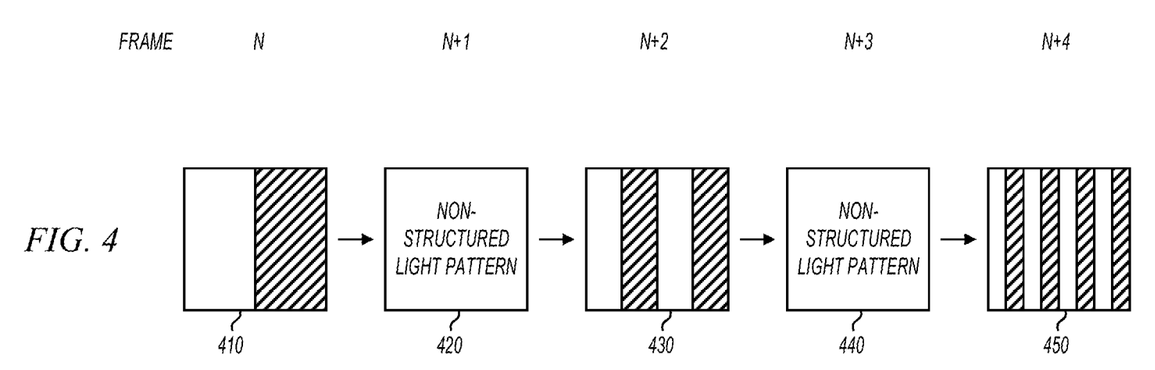
FIGS. 4 and 5 show interlaced structured light patterns and non-structured light patterns in accordance with various embodiments of the present invention.
Figure 5:
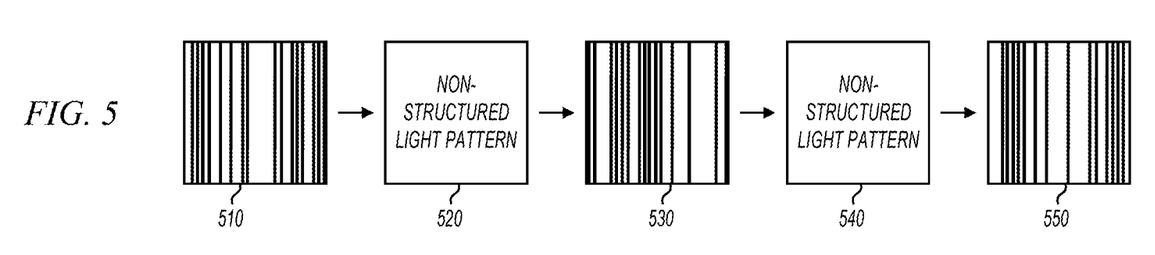

FIGS. 4 and 5 show interlaced structured light patterns and non-structured light patterns in accordance with various embodiments of the present invention. FIG. 4 shows binary patterns in every other frame 410, 430, 450, and non-structured light patterns in every other frame 420, 440. Similarly FIG. 5 shows De Bruijn patterns in every other frame 510, 530, 550, and non-structured light patterns in every other frame 520, 540.

In operation, the patterns shown in FIGS. 4 and 5 may be produced by a 3D depth sensing system such as system 200 (FIG. 2), while generation TOF 3D point cloud data and structured light processing 3D point cloud data. In some embodiments, a light pattern generation circuit such as light pattern generation circuit 240 (FIGS. 2, 3) determines the patterns to be projected and individual pixels to be illuminated within the patterns based on mirror position and other information.

In embodiments represented by FIGS. 4 and 5, TOF measurements may be made during all frames (frames including structured light patterns and frames including non-structured light patterns) or may be made only during frames that include non-structured light patterns. Structured light processing is performed only for frames including structured light patterns. Alternating structured and non-structured light patterns allows TOF 3D point cloud data to be generated quickly for each pixel measured and also allows structured light processing 3D point cloud data to be generated at a higher accuracy. The structured light patterns are not limited to binary and De Bruijn patterns. Any type of structured light pattern or combination of structured light patterns may be used without departing from the scope of the present invention.

Figure 6:
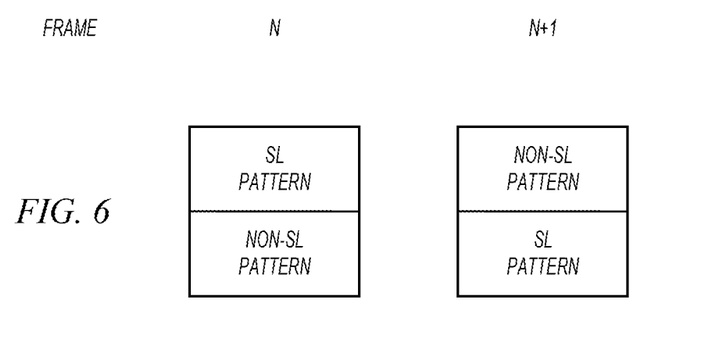
FIG. 6 shows structured light patterns and non-structured light patterns in common frames in accordance with various embodiments of the present invention.

FIG. 6 shows structured light patterns and non-structured light patterns in common frames in accordance with various embodiments of the present invention. In embodiments represented by FIG. 6, structured light (SL) patterns and non-structured light patterns are included in the same frame. For example, in frame N, the top half of the frame includes structured light and the bottom half of the frame includes non-structured light. Also for example, in frame N+1, the top half of the frame includes non-structured light and the bottom half of the frame includes structured light. In some embodiments, this pattern may repeat every other frame. In other embodiments, the mix and location of structured light patterns and non-structured light patterns may vary from frame to frame.

In operation, the patterns shown in FIG. 6 may be produced by a 3D depth sensing system such as system 200 (FIG. 2), while generation TOF 3D point cloud data and structured light processing 3D point cloud data. In some embodiments, a light pattern generation circuit such as light pattern generation circuit 240 (FIGS. 2, 3) determines the patterns to be projected and individual pixels to be illuminated within the patterns based on mirror position and other information.

In embodiments represented by FIG. 6, TOF measurements may be made in all portions in a frame (portions including structured light patterns and portions including non-structured light patterns) or may be made only during portions of frames that include non-structured light patterns. Structured light processing is performed only for portions of frames including structured light patterns. Combining structured and non-structured light patterns allows TOF 3D point cloud data to be generated quickly for each pixel measured and also allows structured light processing 3D point cloud data to be generated at a higher accuracy.

Figure 7:
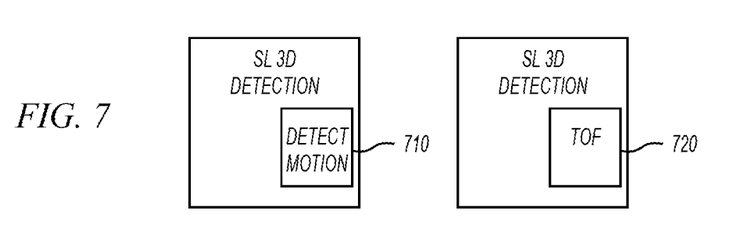
FIGS. 7 and 8 show modification of light pattern generation in response to motion detection in field of view in accordance with various embodiments of the present invention.
Figure 8:
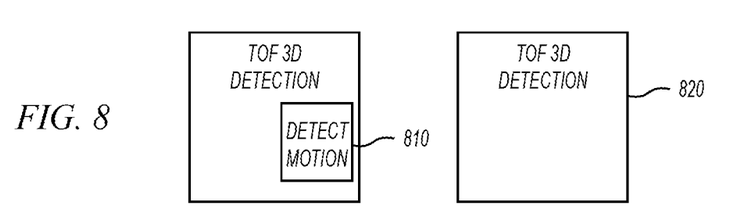

FIGS. 7 and 8 show modification of light pattern generation in response to motion detection in field of view in accordance with various embodiments of the present invention. FIG. 7 shows structured light 3D depth sensing in frame N. This corresponds to the display of structured light pattern and structured light processing as described above. 3D point cloud data from one frame to the next (or multiple frames) are compared to detect motion in a portion of the field of view at 710. In response to motion detection, the 3D depth sensing system modifies the amount and/or placement of structured light patterns and non-structured light patterns in the field of view. For example, when motion is detected, the portion of the field of view surrounding the object in motion may be illuminated with non-structured light in subsequent frames as shown at 720 to allow dense TOF measurement for each pixel surrounding the object in motion. This is an example of an increase in non-structured light pattern content when dynamic features are present in the 3D point cloud.

FIG. 8 shows TOF depth sensing in frame N. This corresponds to the display of non-structured light patterns and TOF measurement as described above. 3D point cloud data from one frame to the next (or multiple frames) are compared to detect motion in a portion of the field of view at 810. In response to motion detection, the 3D depth sensing system may modify the amount and/or placement of structured light patterns and non-structured light patterns in the field of view. For example, when motion is detected, the portion of the field of view surrounding the object in motion may be illuminated with non-structured light in subsequent frames as shown at 820 to allow dense TOF measurement for each pixel surrounding the object in motion. Also for example, subsequent frames that otherwise may have had structured light patterns in the complete field of view may be modified to have non-structured light in portions of the field of view in response to detected motion.

The operations of 3D depth sensing systems as shown in FIGS. 7 and 8 are examples of a light pattern generation circuit such as light pattern generation circuit 240 (FIGS. 2, 3) determining structured and non-structured light pattern content to be produced in the field of view based on static of dynamic features in the 3D point cloud. Note that the 3D point may be a TOF 3D point cloud, a structured light processing 3D point cloud, or a combination.

Figure 9:
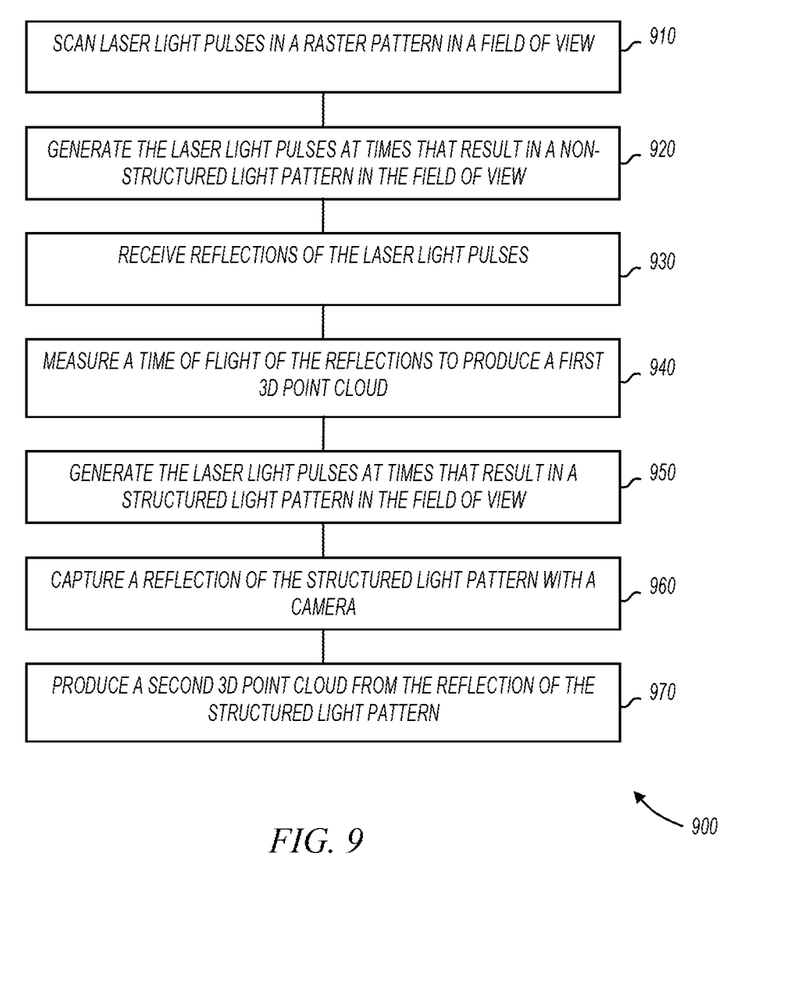
FIGS. 9 and 10 show flow diagrams of methods in accordance with various embodiments of the present invention.

FIG. 9 shows a flow diagram of methods in accordance with various embodiments of the present invention. In some embodiments, method 900, or portions thereof, is performed by a 3D depth sensing system, embodiments of which are shown in previous figures. In other embodiments, method 900 is performed by a series of circuits or an electronic system. Method 900 is not limited by the particular type of apparatus performing the method. The various actions in method 900 may be performed in the order presented, or may be performed in a different order. Further, in some embodiments, some actions listed in FIG. 9 are omitted from method 900.

Method 900 is shown beginning with block 910. As shown at 910, laser light pulses are scanned in raster pattern within a field of view. The scanning may be performed by a single mirror or multiple mirrors (FIG. 2) or a non-mirror scanning mechanism. In some embodiments, the laser light pulses are in the visible spectrum, and in other embodiments, the laser light pulses are in the non-visible spectrum. For example, the laser light pulses may be in the infrared spectrum. In some embodiments, the laser light pulses are generated by a laser light source such as laser light source 264 (FIG. 2) in response to pulses received from a light pattern generation circuit such as light pattern generation circuit 240 (FIGS. 2, 3).

At 920, the laser light pulses are generated at times that result in a non-structured light pattern in the field of view. In some embodiments, the non-structured light pattern may include a dense array of pixels, and in other embodiments, the non-structured light pattern may include randomly placed pixels.

At 930, reflections of the laser light pulses are received. This corresponds to the operation of PD 282 (FIG. 2) receiving reflections at 233. At 940, a time-of-flight of the reflections are measured to produce a first 3D point cloud. The first 3D point cloud is a TOF 3D point cloud that is produced on a pixel by pixel basis at pixel speeds. The accuracy of the first 3D point cloud is not as high as a structured light processing point cloud, but the generation is much faster.

At 950, laser light pulses are generated at times that result in a structured light pattern in the field of view. The structured light pattern may be a binary pattern, a De Bruijn pattern, or any other structured light pattern suitable for structured light processing. In some embodiments, the structured light patterns are generated in common frames with non-structured light patterns. Examples are shown in FIGS. 6-8. In other embodiments, the structured light patterns are generated in frames not in common with non-structured light patterns. Examples are shown in FIGS. 4 and 5.

At 960, reflections of the structured light patterns are captured with a camera, and at 970, a second 3D point cloud is produced from the reflection of the structured light patterns using structured light processing techniques. This corresponds to the operation of camera 284 and structured light processing circuit 288. The second 3D point cloud may take longer to produce than the first 3D point cloud, but will tend to be more accurate. The first and second 3D point clouds may be maintained separately, or may be combined in any fashion.

Figure 10:
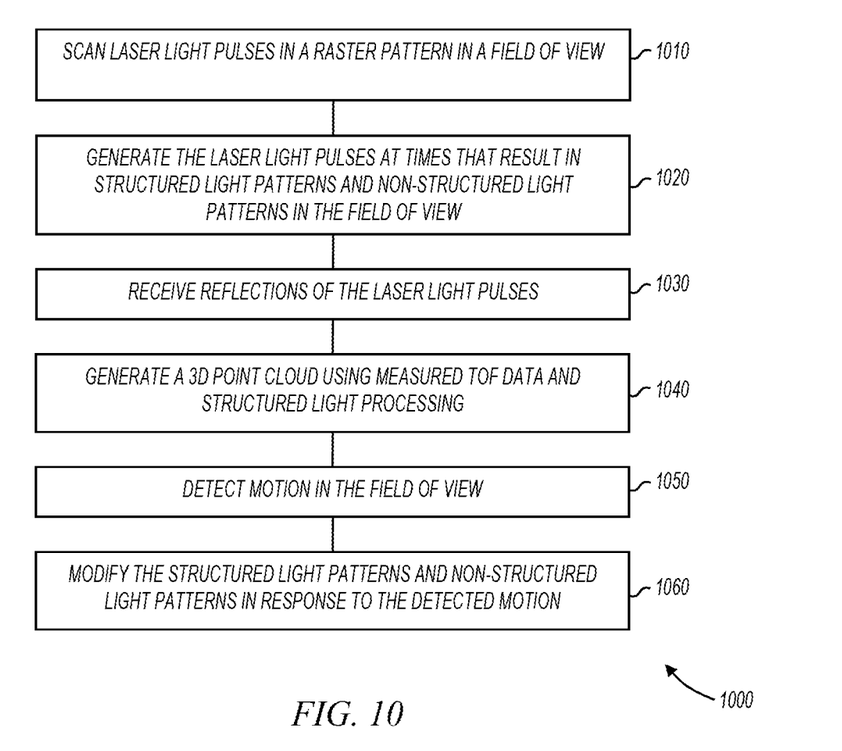

FIG. 10 shows a flow diagram of methods in accordance with various embodiments of the present invention. In some embodiments, method 1000, or portions thereof, is performed by a 3D depth sensing system, embodiments of which are shown in previous figures. In other embodiments, method 1000 is performed by a series of circuits or an electronic system. Method 1000 is not limited by the particular type of apparatus performing the method. The various actions in method 1000 may be performed in the order presented, or may be performed in a different order. Further, in some embodiments, some actions listed in FIG. 10 are omitted from method 1000.

Method 1000 is shown beginning with block 1010. As shown at 1010, laser light pulses are scanned in raster pattern within a field of view. The scanning may be performed by a single mirror or multiple mirrors (FIG. 2) or a non-mirror scanning mechanism. In some embodiments, the laser light pulses are in the visible spectrum, and in other embodiments, the laser light pulses are in the non-visible spectrum. For example, the laser light pulses may be in the infrared spectrum. In some embodiments, the laser light pulses are generated by a laser light source such as laser light source 264 (FIG. 2) in response to pulses received from a light pattern generation circuit such as light pattern generation circuit 240 (FIGS. 2, 3).

At 1020, the laser light pulses are generated at times that result in structured light patterns and non-structured light patterns in the field of view. The structured light pattern may be a binary pattern, a De Bruijn pattern, or any other structured light pattern suitable for structured light processing. In some embodiments, the non-structured light pattern may include a dense array of pixels, and in other embodiments, the non-structured light pattern may include randomly placed pixels. In some embodiments, the structured light patterns are generated in common frames with non-structured light patterns. Examples are shown in FIGS. 6-8. In other embodiments, the structured light patterns are generated in frames not in common with non-structured light patterns. Examples are shown in FIGS. 4 and 5.

At 1030, reflections of the laser light pulses are received. This corresponds to the operation of PD 282 (FIG. 2) receiving reflections at 233 and camera 284 capturing reflections of the structured light patterns. At 1040, a 3D point cloud is generated using measured time-of-flight data and structured light processing. This corresponds to the operation of TOF measurement circuit 286 and structured light processing circuit 288. The generated 3D point cloud may include separate TOF and structured light 3D point clouds or may be combined into a single 3D point cloud.

At 1050, motion is detected in the field of view. In some embodiments, this is performed by light pattern generation circuit 240 (FIG. 2) by comparing subsequent frames of 3D point cloud data. In response to the detected motion, the structured light patterns and non-structured light patterns may be modified at 1060. Example modifications include increasing the amount of non-structured light to accommodate increased TOF measurement processing within the field of view. Examples are shown in, and described with reference to, FIGS. 7 and 8.

At 950, laser light pulses are generated at times that result in a structured light pattern in the field of view.

Figure 11:
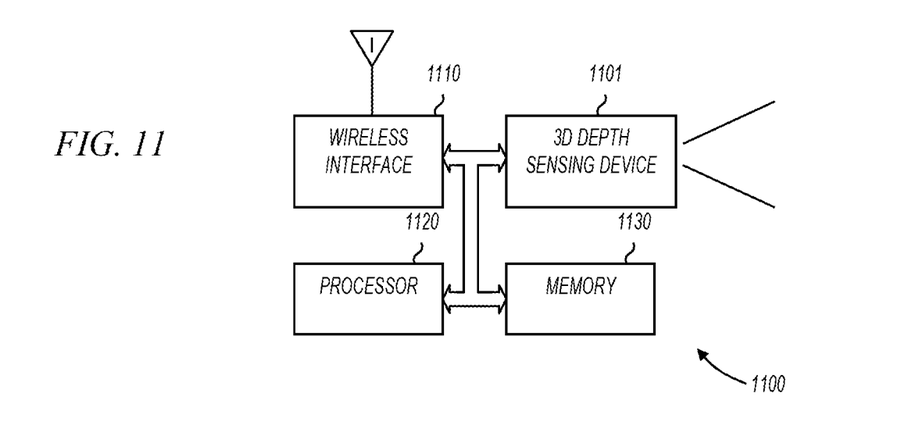
FIG. 11 shows a block diagram of a mobile device in accordance with various embodiments of the present invention.

FIG. 11 shows a block diagram of a mobile device in accordance with various embodiments of the present invention. As shown in FIG. 11, mobile device 1100 includes wireless interface 1110, processor 1120, memory 1130, and 3D depth sensing device 1101. 3D depth sensing device 1101 creates a 3D point cloud using a combination of TOF measurement and structured light processing techniques as described above. For example, 3D depth sensing device 1101 may include any of 3D depth sensing system embodiments described herein.

Wireless interface 1110 may include any wireless transmission and/or reception capabilities. For example, in some embodiments, wireless interface 1110 includes a network interface card (NIC) capable of communicating over a wireless network. Also for example, in some embodiments, wireless interface 1110 may include cellular telephone capabilities. In still further embodiments, wireless interface 1110 may include a global positioning system (GPS) receiver. One skilled in the art will understand that wireless interface 1110 may include any type of wireless communications capability without departing from the scope of the present invention.

Processor 1120 may be any type of processor capable of communicating with the various components in mobile device 1100. For example, processor 1120 may be an embedded processor available from application specific integrated circuit (ASIC) vendors, or may be a commercially available microprocessor. In some embodiments, processor 1120 retrieves 3D point cloud data from 3D depth sensing device 1101. The 3D point cloud data may be provided to wireless interface 1110.

Memory 1130 may includes any type of memory storage device capable of storing processor instructions and/or data. For example, in some embodiments, memory 1130 may be a nontransitory storage device capable of storing instructions that are executable by processor 1120. Also for example, memory 1130 may store retrieved 3D point cloud data and/or intermediate results produced by processor 1120 when performing method embodiments of the present invention.

Figure 12:
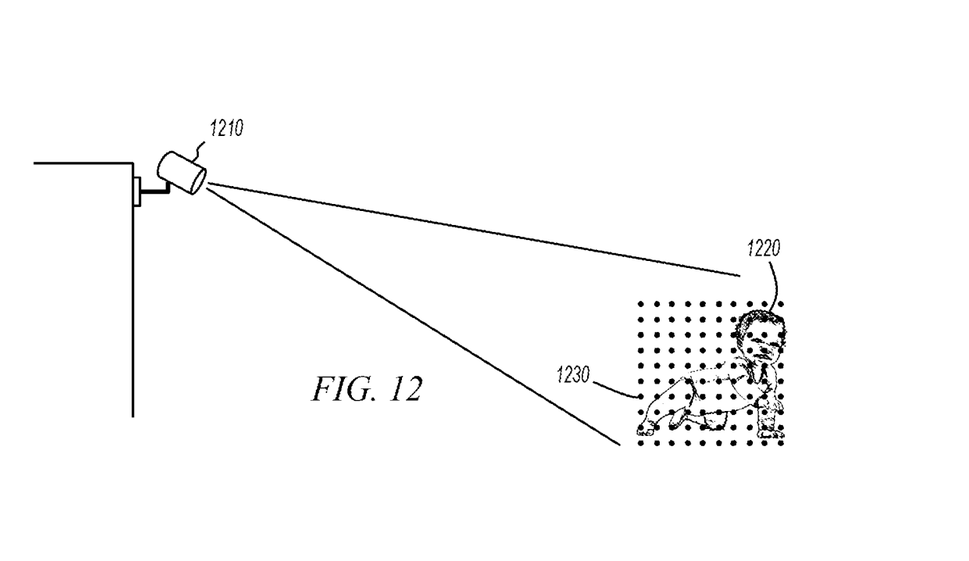
FIG. 12 shows a security camera that includes a 3D depth sensing system.

FIG. 12 shows a security camera 1210 that includes a scanning 3D depth sensing system. In some embodiments, security camera 1210 may detect and classify objects detected in a field of view using an array of TOF detection points 1230 as well as structured light processing techniques as describe above. For example, in a residential security application, security camera 1210 may detect an object and then classify the object as either human or nonhuman. When the object is in motion, the 3D depth sensing system may modify the structured light patterns and non-structured light patterns to quickly regenerate the 3D point cloud surrounding the object in motion.

Figure 13:
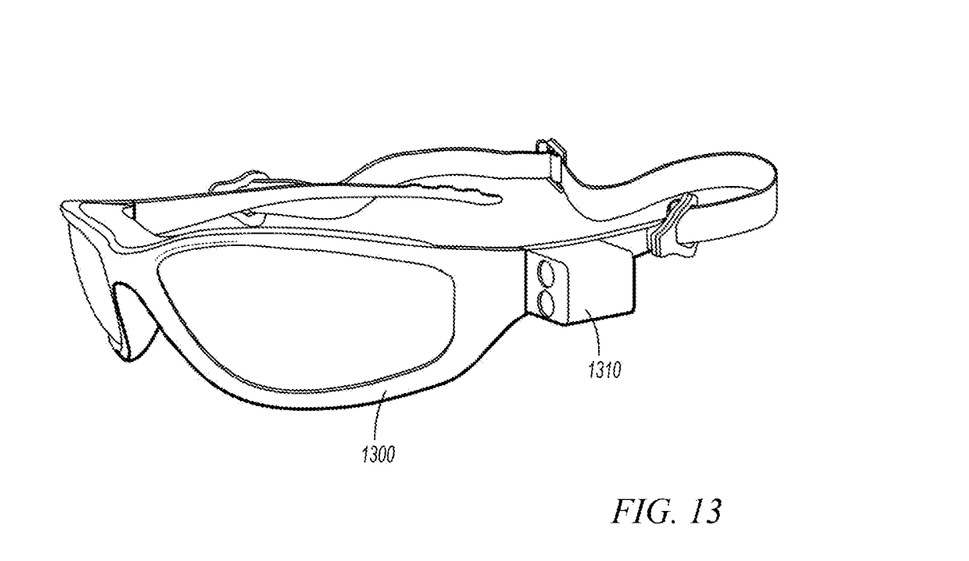
FIG. 13 shows a wearable 3D depth sensing system in accordance with various embodiments of the invention.

FIG. 13 shows a wearable 3D depth sensing system in accordance with various embodiments of the invention. In the example of FIG. 13, the wearable 3D depth sensing system 1300 is in the form of eyeglasses, but this is not a limitation of the present invention. For example, the wearable 3D depth sensing system may be a hat, headgear, worn on the arm or wrist, or be incorporated in clothing. The wearable 3D depth sensing system 1300 may take any form without departing from the scope of the present invention.

Wearable 3D depth sensing system 1300 includes 3D depth sensing device 1310. 3D depth sensing device 1310 creates a 3D point cloud by combining TOF measurement and structured light processing as described above. For example, 3D depth sensing device 1310 may include any of the 3D depth sensing system embodiments described herein.

In some embodiments, wearable 3D depth sensing system 1300 provides feedback to the user that is wearing the system. For example, a head up display may be incorporated to overlay 3D images with data to create a virtual reality, an augmented reality. Further, tactile feedback may be incorporated in the wearable 3D depth sensing device to provide interaction with the user.

Figure 14:
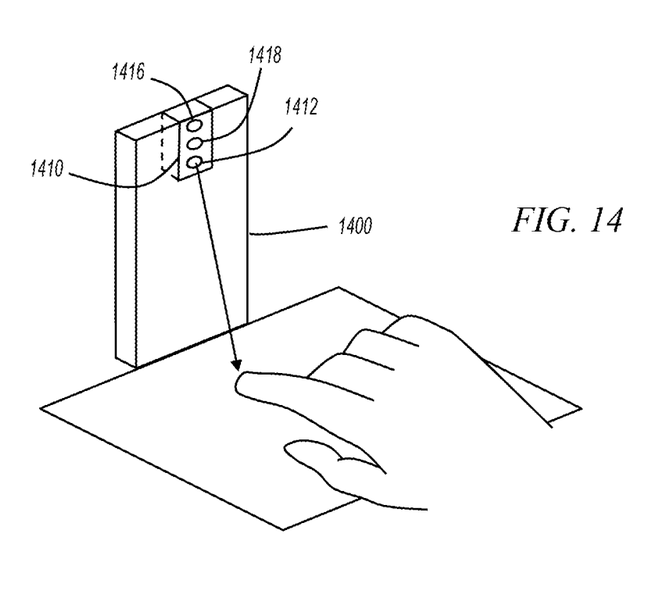
FIG. 14 shows a tabletop 3D depth sensing system in accordance with various embodiments of the present invention.

FIG. 14 shows a tabletop 3D depth sensing system in accordance with various embodiments of the present invention. Tabletop 3D depth sensing system 1400 includes 3D sensing device 1410, which in turn includes scanning device 1412, photodetector 1418, and camera 1416. In some embodiments, 3D depth sensing device 1410 is implemented as 3D depth sensing system 200 (FIG. 2). In operation, tabletop 3D depth sensing system 1400 may be used for an interactive tabletop or kitchen counter application where the 3D TOF sensing may be utilized for fast gesture and virtual touch detection for interactivity, and structured light processing may be utilized for making accurate volumetric measurements or models of objects on the table.

3D depth sensing devices described herein have many additional applications. For example, various embodiments of the present invention may be included in automobiles for the purposes of occupancy detection, sleep/gaze detection, gesture detection, interaction, communication, and the like. Also for example, various embodiments of the present invention may be included in cameras and security or surveillance devices such as home security devices, smart cameras, IP cameras, and the like.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
a laser light source to emit laser light pulses;
at least one scanning mirror to reflect and scan the laser light pulses into a field of view;
a light pattern generation circuit to generate pulses to drive the laser light source at times that produce structured light patterns in the field of view and non-structured light patterns in the field of view;
a time-of-flight measurement circuit to receive reflections of, and to determine times-of-flight of, the laser light pulses to determine a first 3D point cloud of the field of view;
a camera to capture reflections of the structured light patterns;
a structured light processing circuit to determine a second 3D point cloud of the field of view; and
wherein the light pattern generation circuit is configured to generate pulses to drive the laser light source at times that produce the structured light patterns in the field of view and the non-structured light patterns in the field of view based on static or dynamic features in the first or second 3D point cloud.

2. The apparatus of claim 1 wherein the light pattern generation circuit is configured to generate pulses to drive the laser light source at times that produce the structured light patterns in the field of view and the non-structured light patterns in the field of view based on static or dynamic features in the first or second 3D point cloud comprises detecting motion using the first 3D point cloud and increasing non-structured light content in response to the detected motion.

3. The apparatus of claim 1 wherein the scanning mirror sweeps the laser light pulses in a raster pattern, each sweep of the raster pattern constituting a frame, and wherein the light pattern generation circuit is configured to generate pulses to drive the laser light source at times that produce the structured light patterns in the field of view and the non-structured light patterns in the field of view such that the structured light patterns and the non-structured light patterns are produced in different frames.

4. The apparatus of claim 1 wherein the scanning mirror sweeps the laser light pulses in a raster pattern, each sweep of the raster pattern constituting a frame, and wherein the light pattern generation circuit is configured to generate pulses to drive the laser light source at times that produce the structured light patterns in the field of view and the non-structured light patterns in the field of view such that the structured light patterns and the non-structured light patterns are produced in a single frame.

5. The apparatus of claim 1 wherein the light pattern generation circuit is configured to generate pulses to drive the laser light source at times that produce the structured light patterns in the field of view and non-structured light patterns in the field of view based on static or dynamic features in the first or second 3D point cloud by increasing to increase non-structured light pattern content when dynamic features are present in the first or second 3D point cloud.

6. The apparatus of claim 1 wherein the scanning mirror sweeps the laser light pulses in a raster pattern, each sweep of the raster pattern constituting a frame, and wherein the light pattern generation circuit is configured to generate pulses to drive the laser light source at times that produce the structured light patterns in the field of view and the non-structured light patterns in the field of view such that the structured light patterns and the non-structured light patterns are produced in alternating frames.

7. The apparatus of claim 1 wherein the structured light patterns comprise binary coded structured light patterns.

8. The apparatus of claim 1 wherein the structured light patterns comprise De Bruijn coded structured light patterns.

9. A 3D depth sensing device comprising:
a light pattern generation circuit to generate pulses at times that result in infrared laser light pulses that create a combination of structured light patterns and non-structured light patterns when scanned in a field of view;
a scanning mirror to scan the infrared laser light pulses in the field of view;
a time-of-flight measurement circuit to measure times-of-flight of received reflected infrared laser light pulses;
an infrared camera to capture a reflected infrared light pattern created by the infrared laser light pulses;
a processing circuit to create a 3D point cloud from the reflected infrared light pattern and the times-of-flight; and
wherein the light pattern generation circuit is further configured to generate pulses at times to modify the structured light patterns and the non-structured light patterns in response to data within the 3D point cloud.

10. The 3D depth sensing device of claim 9 wherein the light pattern generation circuit is configured to generate pulses at times to modify the structured light patterns and non-structured light patterns based in response to data within the 3D point cloud comprises detecting motion using the 3D point cloud and increasing non-structured light content in response to the detected motion.

11. The 3D depth sensing device of claim 9 wherein the time-of-flight measurement circuit is configured to measure received reflections of the laser light pulses in the non-structured light patterns, and the infrared camera is configured to capture the structured light patterns.

12. The 3D depth sensing device of claim 9 wherein the scanning mirror sweeps the laser light pulses in a raster pattern, each sweep of the raster pattern constituting a frame, and wherein the light pattern generation circuit is configured to generate pulses at times that result in the infrared laser light pulses that create the combination of the structured light patterns and the non-structured light patterns when scanned in the field of view such that the structured light patterns and the non-structured light patterns are produced in common frames.

13. The 3D depth sensing device of claim 9 wherein the scanning mirror sweeps the laser light pulses in a raster pattern, each sweep of the raster pattern constituting a frame, and wherein the light pattern generation circuit is configured to generate pulses at times that result in the infrared laser light pulses that create the combination of the structured light patterns and the non-structured light patterns when scanned in the field of view such that the structured light patterns and the non-structured light patterns are produced in different frames.

14. A method comprising:
scanning laser light pulses in a raster pattern in a field of view while generating the laser light pulses at times that result in a non-structured light pattern in the field of view and while generating the laser light pulses at times that result in a structured light pattern in the field of view;
receiving reflections of the laser light pulses;
measuring a time of flight of the reflections to produce a first 3D point cloud;
scanning laser light pulses in a raster pattern in the field of view while generating the laser light pulses at times to modify the structured light pattern in response to data within the first 3D point cloud;
capturing a reflection of the modified structured light pattern with a camera; and
producing a second 3D point cloud from the reflection of the modified structured light pattern.

15. The method of claim 14 wherein scanning laser light pulses in a raster pattern in the field of view while generating the laser light pulses at times to modify the structured light pattern in response to data within the first 3D point cloud comprises detecting motion in the field of view using data within the first 3D point cloud modifying the structured light pattern in response to the detected motion in the field of view.

16. The method of claim 14 further comprising measuring a time-of flight of reflected laser light pulses that result in the non-structured light pattern.

17. The method of claim 14 wherein scanning laser light pulses in a raster pattern in the field of view comprises scanning the laser light pulses in successive frames, wherein structured light patterns and non-structured light patterns are produced in different frames.

18. The method of claim 14 wherein scanning laser light pulses in a raster pattern in the field of view comprises scanning the laser light pulses in successive frames, wherein structured light patterns and non-structured light patterns are produced in common frames.

19. The method of claim 14 wherein scanning laser light pulses in a raster pattern in the field of view while generating the laser light pulses at times to modify the structured light pattern in response to data within the first 3D point cloud comprises detecting motion in the field of view using data within the first 3D point cloud and increasing non-structured light content in response to the detected motion in the field of view.

\* \* \* \* \*